United States Patent

Emori

[11] Patent Number: 5,097,869
[45] Date of Patent: Mar. 24, 1992

[54] FLUID CONTROL VALVE DEVICE
[75] Inventor: Yasuyoshi Emori, Saitama, Japan
[73] Assignee: Jidosha Kiki Co., Ltd., Tokyo, Japan
[21] Appl. No.: 720,351
[22] Filed: Jun. 25, 1991
[30] Foreign Application Priority Data
Jun. 28, 1990 [JP] Japan ................................. 67884[U]
[51] Int. Cl.$^5$ ................................................ F15B 9/00
[52] U.S. Cl. ............................ 137/625.23; 137/625.24; 91/375 A; 91/375 R
[58] Field of Search ...................... 137/624.21, 624.22, 137/624.23, 624.24; 91/375 R, 375 A

[56] References Cited
U.S. PATENT DOCUMENTS

| | | | |
|---|---|---|---|
| 4,335,749 | 6/1982 | Walter | 91/375 A X |
| 4,452,247 | 6/1984 | Haga | 91/375 A X |
| 4,460,016 | 7/1984 | Haga | 137/625.24 |
| 4,469,342 | 9/1984 | Millard | 137/625.64 X |
| 4,624,283 | 11/1986 | Futaba | 137/625.24 |

Primary Examiner—Alan Cohan
Attorney, Agent, or Firm—Townsend & Townsend

[57] ABSTRACT

A fluid control valve device includes a sleeve, a rotor, and a first recess groove. The sleeve has an inner circumferential surface in which two types of axial channel grooves communicating with an input port and a return port are formed in the circumferential direction, and left and right output ports are open in land portions between the channel grooves. The rotor is inserted in the inner circumferential surface of the sleeve so as to be rotatably held relative to the sleeve and has an outer circumferential surface in which channel grooves communicating with the axial channel grooves of the sleeve are formed in the circumferential direction at positions opposite to the land portions in which the output ports of the sleeve are open, and first and second land portions are formed at positions opposite to the channel grooves of the sleeve. The first recess groove is formed in the first land portion of the rotor to oppose a fluid supply hole communicating with the input port and open in the channel groove of the sleeve.

10 Claims, 4 Drawing Sheets

FLUID CONTROL VALVE DEVICE

BACKGROUND OF THE INVENTION

The present invention relates to a fluid control valve device suitably used as a rotary fluid channel switching valve in a power steering apparatus of a hydraulic type or the like for reducing a steering wheel operating force of, e.g., an automobile and, more particularly, to an improvement in a rotary fluid control valve device for controlling distribution of a fluid pressure by relative rotational displacement between a rotor and a sleeve.

A fluid control valve device of this type is used as a fluid channel switching valve in a power steering apparatus or the like to operate a power cylinder as a movable unit in accordance with a steering wheel operation, thereby generating an auxiliary steering force during a steering operation. Various types of such a fluid control valve device have been conventionally proposed as disclosed in, e.g., Japanese Patent Laid-Open No. 57-178971 and Japanese Utility Model Publication No. 63-30613. That is, in this fluid channel switching valve, a rotor formed integrally with an input shaft (stab shaft) of a steering wheel and a sleeve formed integrally with its output shaft (pinion shaft) are assembled to be rotationally displaced relative to each other and arranged in a valve housing. A plurality of channel grooves formed in the outer circumferential surface of the rotor and the inner circumferential surface of the sleeve in their circumferential direction are connected to channels communicating with an oil pump as a fluid pressure generating source, an oil tank, and right and left cylinder chambers constituting a power cylinder, thereby easily and properly switching fluid channels of a fluid pressure circuit (hydraulic circuit). In addition, the arrangement of the device is simple.

One of problems posed when the above rotary fluid control valve device is used as a fluid channel switching valve in a power steering apparatus is a noise problem. That is, in the hydraulic circuit extending from the pump to the right and left cylinder chambers or to the tank through the pressurized oil channels in the fluid channel switching valve, an abrupt increase or decrease in a fluid channel sectional area forms a turbulence, a vortex, or the like in a flow of a pressurized oil in the pressurized oil channels constituted by the channel grooves or land portions formed in the rotor and the sleeve of the control valve and channel holes formed to open in the grooves or the land portions, thereby generating a fluid sound (so-called shoo sound). More specifically, when a wide or narrow portion, a bent portion, a branch portion, or the like is present in the fluid channel through which the pressurized oil flows, since a pressure variation is caused to form a turbulence or a vortex, generation of the fluid sound is more or less inevitable. However, this fluid sound is desired to be minimized in the fluid channel switching valve of this type.

Especially in the above rotary fluid channel switching valve for use in a power steering apparatus, the channel grooves and the land portions formed in the sleeve inner circumferential surface and the rotor outer circumferential surface are selectively combined by the relative rotational displacement therebetween, thereby connecting or disconnecting the fluid channels to perform switching between the fluid channels. Throttle portions formed between side edge portions of the land portions for controlling connection/disconnection of the fluid channels abruptly change the fluid channel sectional area because the side edge portions are formed as sharp corner portions. Therefore, a turbulence or a vortex is inevitably formed in the flow of a pressurized oil flowing from an input port of the pump into the channel grooves. For this reason, Japanese Utility Model Publication No. 63-38138, for example, proposes an arrangement in which the throttle portion defined between the two side edges of the channel grooves communicating with the input port or the two side edges of the land portions is formed to have a structure which does not cause much change in fluid channel sectional area by forming the shape of the side edge portion into an inclined surface shape, thereby solving the noise problem. However, this arrangement is still unsatisfactory to prevent the fluid sound caused by the flow of a pressurized oil. Therefore, a demand has arisen for a countermeasure capable of solving the above noise problem with a comparatively simple and inexpensive arrangement.

In addition, this noise problem similarly arises in channel grooves or a fluid discharge hole portion communicating with a return port to the tank in the above rotary fluid channel switching valve. Therefore, this point must also be considered.

SUMMARY OF THE INVENTION

It is an object of the present invention to provide a fluid control valve device capable of preventing generation of noise caused by a fluid sound with a simple and inexpensive arrangement.

It is another object of the present invention to provide a fluid control valve device capable of preventing formation of a turbulence or a vortex to obtain a smooth fluid flow.

In order to achieve the above objects of the present invention, there is provided a fluid control valve device comprising a sleeve having an inner circumferential surface in which two types of axial channel grooves communicating with an input port and a return port are formed in a circumferential direction, and left and right output ports are open in land portions between the channel grooves, a rotor inserted in the inner circumferential surface of the sleeve so as to be rotatably held relative to the sleeve and having an outer circumferential surface in which channel grooves communicating with the axial channel grooves of the sleeve are formed in the circumferential direction at positions opposite to the land portions in which the output ports of the sleeve are open, and first and second land portions are formed at positions opposite to the channel grooves of the sleeve, and a first recess groove formed in the first land portion of the rotor to oppose a fluid supply hole communicating with the input port and open in the channel groove of the sleeve.

According to the present invention, a fluid supplied from the input port into the channel groove formed in the sleeve inner circumferential surface through the fluid supply hole smoothly flows without forming any turbulence or vortex by the recess groove formed to oppose the fluid supply hole at the land portion an the rotor side opposite to the channel groove. In addition, the fluid flows to the channel grooves on the output port side and the channel grooves on the return port side through throttle portions between the two side edge portions of the land portion on the rotor side and the side edge portions of the land portions defining the channel groove on the input port side opposite to the land portion on the rotor side. Therefore, the conventional problem of noise such as a fluid sound can be reduced.

In addition, according to the present invention, the flow of a fluid flowing into the fluid discharge hole to the return port side can be smoothened by forming the recess groove in the land portion of the rotor in which the discharge hole opens. As a result, the noise can be reduced as described above.

DETAILED DESCRIPTION OF THE PREFERRED EMBODIMENTS

Embodiments of the present invention will be described in detail below with reference to the accompanying drawings.

Figure 4:
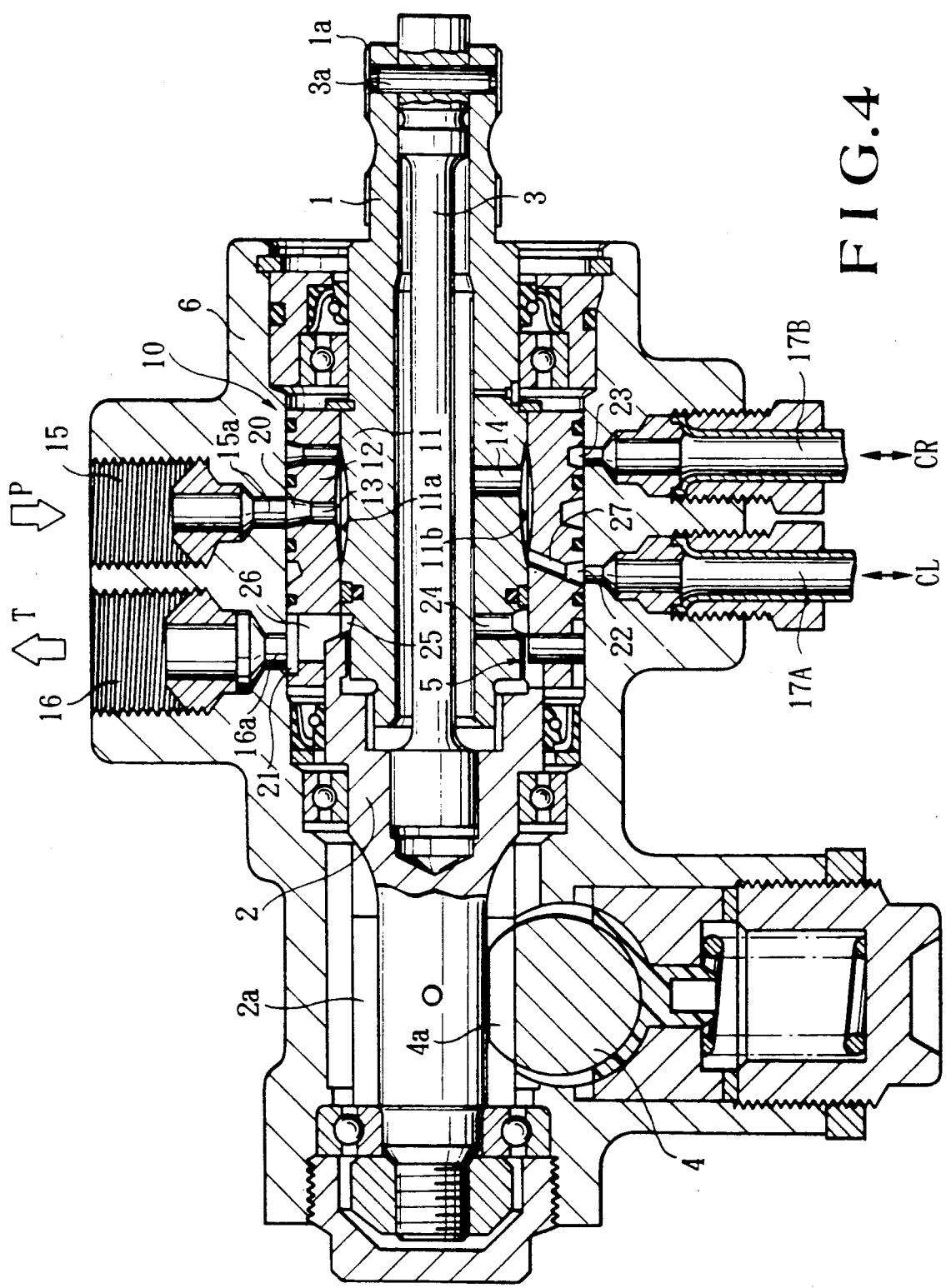
FIG. 4 is a schematic sectional view showing a power steering main body portion in a power steering apparatus to which the device of the present invention can be suitably applied.

FIGS. 1 to 4 show an embodiment of a fluid control valve device according to the present invention, in which the present invention is used as a rotary fluid channel switching valve 10 in a power steering main body portion of a power steering apparatus shown in FIG. 4.

A schematic arrangement of the power steering main body portion of the power steering apparatus to which the present invention is applied will be briefly described below with reference to FIG. 4. Referring to FIG. 4, reference numeral 1 denotes a stab shaft as an input shaft coupled to a steering wheel (not shown); and 2, a pinion shaft coupled to the inner end (left end) of the stab shaft 1 via a torsion bar 3 and having a pinion 2a which meshes with rack teeth 4a on a rack 4 constituting a steering link mechanism (not shown). A safety spline portion 5 constituted by a projecting portion and a groove portion is interposed between the shafts 1 and 2 as a fail safe mechanism for allowing a relative pivotal displacement within a predetermined angle range using a twist of the torsion bar 3. The inner end of the torsion bar 3 is fixed in the pinion shaft 2 by a pressure, and its outer end is extended to the outer end (right end) of the stab shaft 1 through the shaft 1 and coupled at a serration portion 1a for coupling with the steering wheel side, of the stab shaft 1 by a coupling pin 3a driven in a pin insertion hole formed to extend through the portion 1a and the torsion bar 3.

On the inner end sides of the shafts 1 and 2 in a body (housing) 6 constituting the power steering main body portion, a rotor 11 and a sleeve 12 constituting the rotary fluid channel switching valve 10 described above are formed integrally with the respective corresponding shafts, and switch fluid channels from an oil pump P and an oil tank T to power cylinder left and right chambers CL and CR (neither of which are shown) by relative rotational displacement. The rotor 11 is formed integrally with the stab shaft 1, and the sleeve 12 is coupled integrally with the pinion shaft 2 by pinning. The rotor 11 and the sleeve 12 are so assembled as to be rotationally displaced relative to each other and housed in a valve housing portion of the body 6.

A hydraulic circuit arrangement in the rotor 11 and the sleeve 12 constituting the rotary fluid channel switching valve 10 and the valve housing (body 6) is well known to those skilled in the art. As is apparent from FIGS. 1 and 3, a plurality of channel grooves 11a and 11b; and 12a and 12b are formed with predetermined intervals therebetween in the circumferential direction in the outer circumferential surface of the rotor 11 and the inner circumferential surface of the sleeve 12 opposite to and in slidable contact with each other, respectively. In addition, a plurality of holes (a fluid supply hole 13 and fluid discharge holes 14) are formed in arbitrary portions. Switching of the hydraulic circuit is controlled as needed by selectively connecting or disconnecting the channel grooves 11a and 11b; and 12a and 12b and the like.

Referring to FIG. 4, reference numerals 15 and 16 denote an input port for supplying a pressurized oil from the oil pump P and a return port for returning the oil to the oil tank T, respectively; and 17A and 17B, left and right output ports connected to the power cylinder left and right cylinder chambers CL and CR, respectively. In the outer circumferential surface of the sleeve 12, supply- and return-side annular grooves 20 and 21 and left and right output-side annular grooves 22 and 23 are formed in positions offset in the axial direction to communicate with the respective corresponding ports described above. The annular grooves 20 and 21; and 22 and 23 are connected to a port hole 21a constituting the input port 15 and a port hole 16a constituting the return port 16; and port holes on the respective output sides, respectively. The pressurized oil is supplied from the input port 15 into the supply-side annular groove 20 and flows into the input port-side channel groove 12a of the sleeve 12 through the fluid supply hole 13 formed in the sleeve 12. The pressurized oil flowing from the channel groove 12a to the return port-side channel grooves 12b which communicate with the channel groove 12a in the circumferential direction through the left and right output-side channel grooves 11a and 11b flows into the fluid discharge holes 14 formed in the rotor 11 and the interior of the rotor 11 and guided to the return-side annular groove 21 through a fluid discharge hole 24 formed in the rotor 11 at a position offset in the axial direction, an annular space 25 defined between the rotor 11 and the sleeve 12, and a fluid discharge hole 26 formed in the sleeve 12. The oil is then returned from the return port 16 to the tank T. When the relative position between the rotor 11 and the sleeve 12 is rotationally displaced to either direction, the return channel described above is disconnected to supply the pressurized oil from the left and right output-side channel grooves 11a and 11b to one of the power cylinder left and right chambers through channel holes 27 (only one of which is shown in FIG. 4), the output-side annular grooves 22 and 23, and the output ports 17A and 17B. Meanwhile, the other channel system is connected to the return channel.

According to the present invention, the fluid control valve device as the rotary fluid channel switching valve 10 used in the power steering apparatus as described above comprises the sleeve 12 and the rotor 11 assembled to be pivotally displaced relative to each other and having slidable contact surfaces in which a plurality of channel grooves 12a and 12b; and 11a and 11b are formed in the circumferential direction to be selectively connected or disconnected with respect to the input port 15, the return port 16, or the output port 17A or 17B. In addition, in a land portion 11c formed on the outer circumferential surface of the rotor 12 so as to oppose the input port-side channel groove 12a formed in the inner circumferential surface of the sleeve 12, a recess groove 30 is formed to oppose the fluid supply hole 13 opened to supply a pressurized oil (fluid) from the port 15 to the input port-side channel groove 12a.

In this embodiment, the two side edge portions of the land portion 11c having the above recess groove 30 are formed into two-step inclined surface portions so as to obliquely face the channel grooves 11a and 11b adjacent to the land portion 11c and smoothen the flow of a pressurized oil in throttle portions 31 and 32 for selectively connecting/disconnecting the input port-side channel groove 12a with respect to the channel grooves 11a and 11b. However, the surface of the side edge portion is not limited to the above surface and may be, e.g., an arcuated surface.

Figure 1:
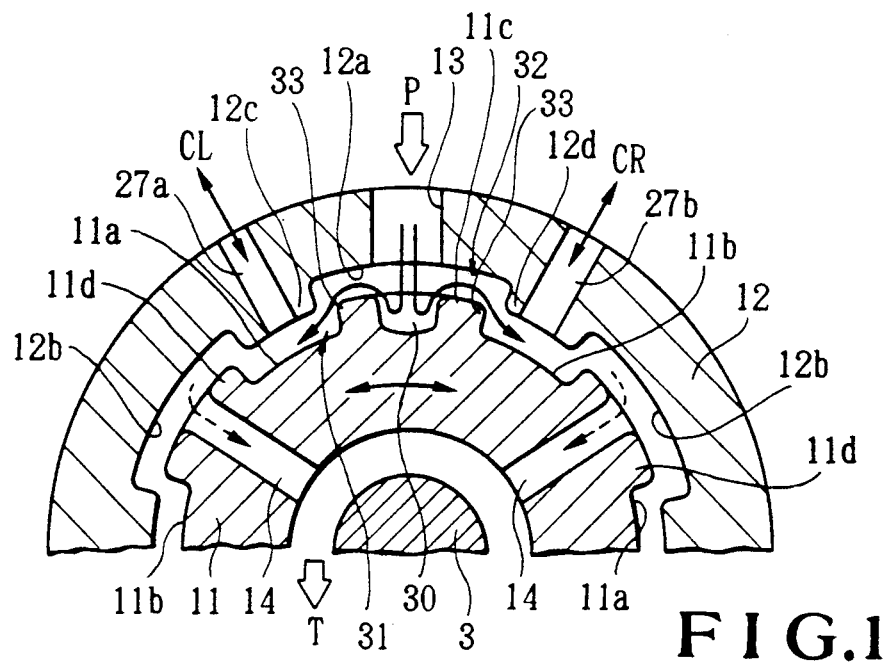
FIG. 1 is a sectional view showing a main part of an embodiment of a fluid control valve device according to the present invention.
Figure 2:
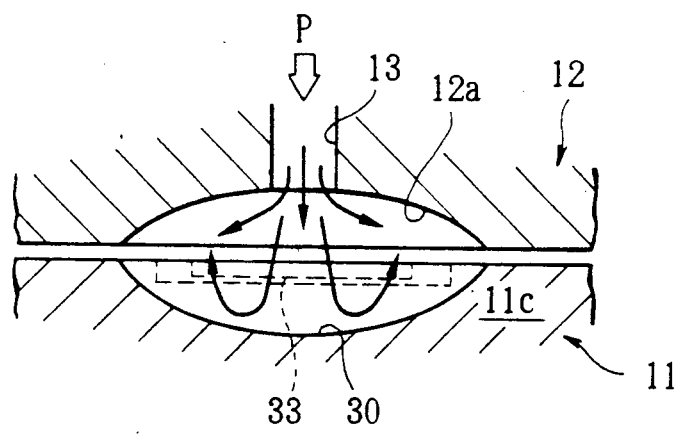
FIG. 2 is a schematic sectional view showing the main part of the embodiment shown in FIG. 1 in an enlarged scale in the axial direction.
Figure 3:
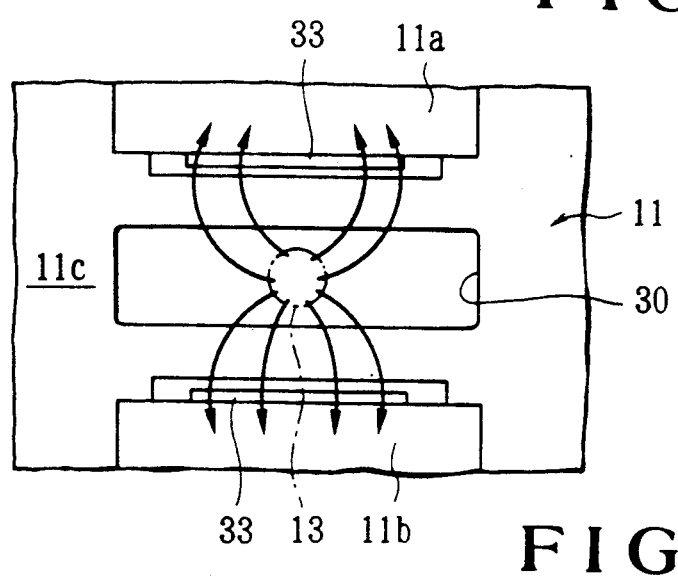
FIG. 3 is a schematic view for explaining a recess groove in a land portion of the outer circumferential surface of a rotor, which is a characteristic feature of the present invention.

Note that in FIG. 1, reference numerals 11d denote other land portions of the rotor 11 in which the fluid discharge holes 14 communicating with the return port oil flowing from the supply hole 13 from forming a turbulence or a vortex caused by, e.g., an abrupt increase in fluid channel area, thereby realizing a smooth flow with less diffusion. This will be easily understood because the size of the fluid channel can be gradually increased or decreased in the above arrangement.

In addition, in the above arrangement, the recess groove 30 need only be formed in the land portion 11c formed on the rotor 11 to oppose the channel groove 12a communicating with the fluid supply hole 13 of the sleeve 12. Since the recess groove 30 is formed on the outer circumferential surface of the rotor 11, advantages such as high processability and low manufacturing cost can be obtained.

Figure 5:
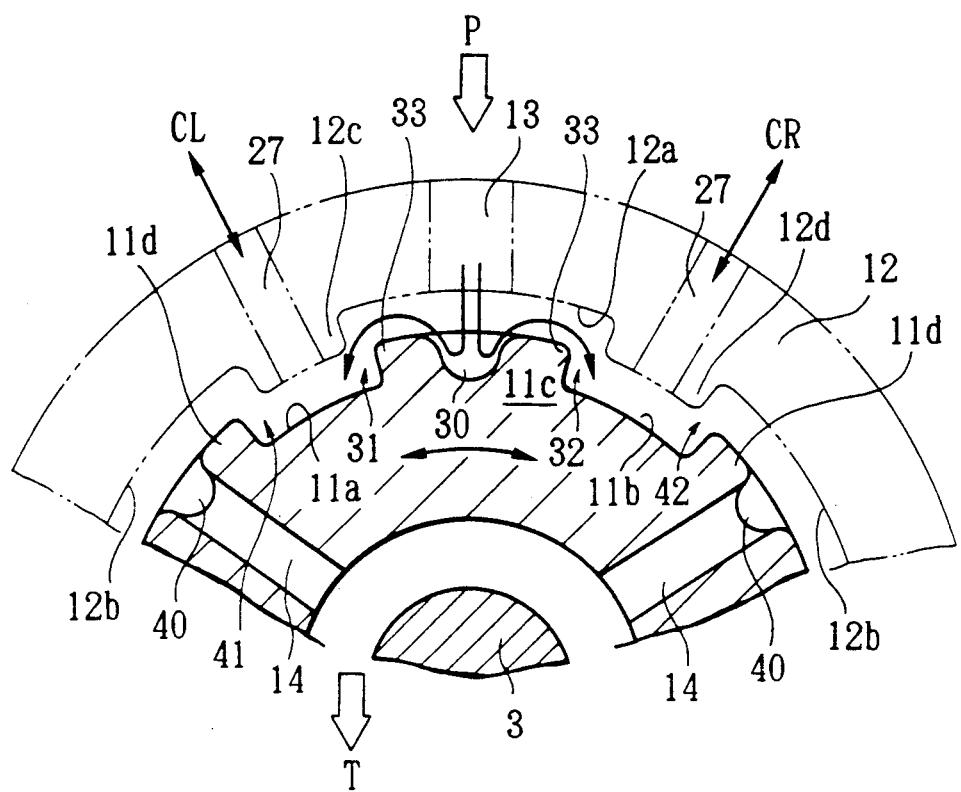
FIGS. 5 and 6 are a schematic sectional view showing another embodiment of the present invention and a side view showing a main part of the embodiment, respectively.
Figure 6:
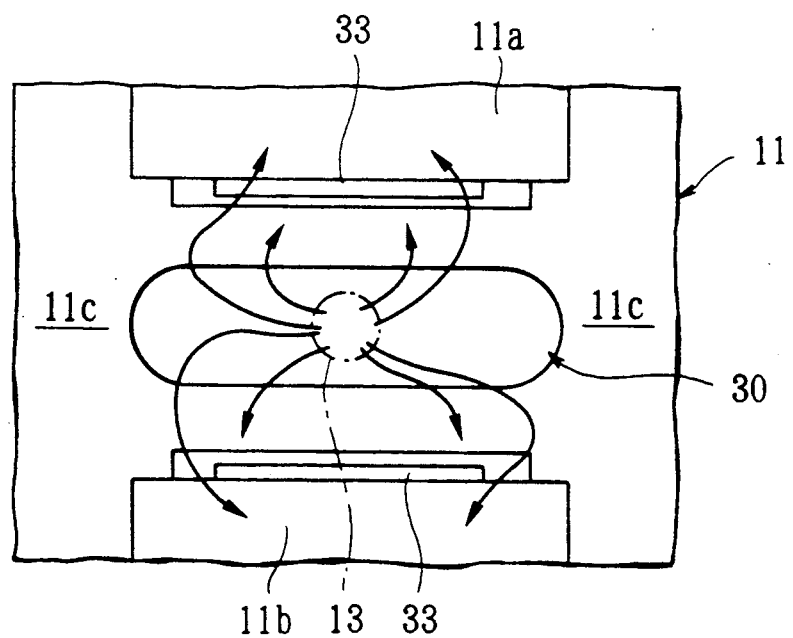

FIGS. 5 and 6 show another embodiment of the present invention. In this embodiment, the groove bottom of a recess groove 30 is formed to have an arcuated surface, thereby further smoothening the flow of a pressurized oil than in the above embodiment. In this arrangement, the recess groove 30 including two end portions along the axial direction may be formed by an arcuated surface, and other channel grooves 11a and 11b may be formed by arcuated surfaces accordingly.

Figure 7A:
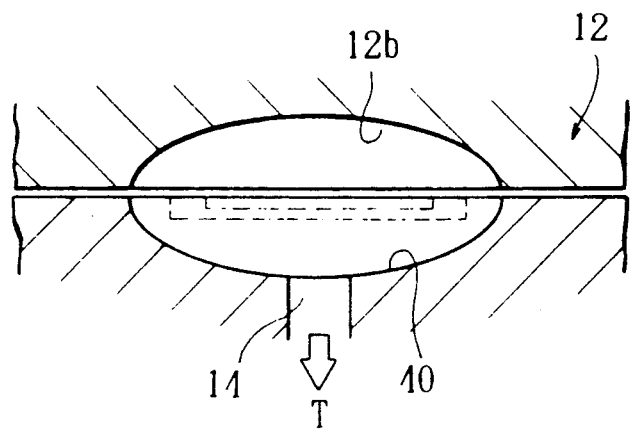
FIGS. 7a and 7b are a schematic sectional view showing a main part of a valve device for explaining still another embodiment of the present invention in an enlarged scale in the axial direction and a schematic view for explaining a recess groove shape of the outer circumferential surface of a rotor.
Figure 7B:
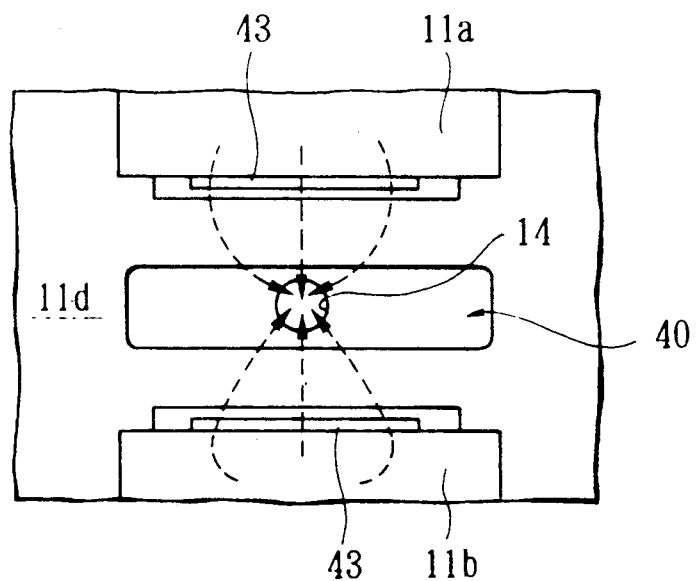

In this embodiment, as is apparent from FIGS. 5, 7a and 7b, another recess groove 40 is formed in an opening 16 to the tank T are formed; and 12c and 12d, land portions of the sleeve 12 in which the channel holes 27 communicating with the output ports 17A and 17B are formed.

With the above arrangement, a pressurized oil supplied from the input port 15 into the channel groove 12a formed in the inner circumferential surface of the sleeve 12 through the fluid supply hole 13 can smoothly flow without forming a turbulence or a vortex by the presence of the recess groove 30 formed in the land portion 11c of the rotor 11 opposite to the channel groove 12a so as to oppose the fluid supply hole 13. Also, the pressurized oil flows to the channel grooves 11a and 11b on the side of the output ports 17A and 17B and to the channel grooves 12b communicating with the fluid discharge holes 14 on the return port 16 side through the throttle portions 31 and 32 between the two side edge portions of the land portion 11c and the side edge portions of the land portions 12c and 12d which define the input port-side channel groove 12a opposite to the land portion 11c and in which the channel holes 27 are formed. Therefore, noise such as a fluid sound generated in conventional systems can be reduced. In particular, according to the present invention, the recess groove 30 is formed in a portion opposite to the fluid supply hole 13 via the channel groove 12a. Therefore, the presence of the recess groove 30 prevents the pressurized end portion of each land portion 11d of a rotor 11 at which a fluid discharge hole 14 communicating with a return port 16 is open so as to oppose a return port-side channel groove 12b of a sleeve 12. With this arrangement, a smooth flow of a pressurized oil can be obtained in the fluid discharge holes 14 connected to the return port 16 as in a fluid supply hole 13 connected to an input port 15. In this case, when the recess grooves 40 on the return port 16 side are formed together with the recess groove 30 on the input port 15 side as shown in FIG. 5, the effect of the present invention can be enhanced. However, even when only the recess grooves 40 are formed, the effect of smoothening the pressurized oil flow can be achieved. Note that reference numerals 41 and 42 in FIG. 5 denote throttle portions for allowing the return port-side channel grooves 12b to communicate with output port-side channel grooves 11a and 11b, respectively; and 43 in FIG. 7B, inclined surface portions each having a two-step arrangement or the like to smoothen flows at the throttle portions 41 and 42.

The present invention is not limited to the structures of the above embodiments, but the shape, the structure, and the like of each part of the rotary fluid channel switching valve 10 as the fluid control valve device can be arbitrarily changed and modified to make various modifications. In the above embodiments, the present invention is used as the rotary fluid channel switching valve 10 of a power steering apparatus. However, the present invention is not limited to the above embodiments but may be used as rotary fluid control valve devices in a variety of fields.

According to the fluid control valve device according to the present invention as has been described above, a fluid supplied from an input port to a channel groove formed in the inner circumferential surface of a sleeve through a fluid supply hole can be smoothly flowed without forming a turbulence or a vortex by the presence of a recess groove formed in a land portion on the rotor side opposite to the channel groove so as to oppose the fluid supply hole. In addition, the fluid can be flowed to channel grooves on the output port side and channel grooves on the return port side through throttle portions formed between the two side edge portions of the land portion on the rotor side and the side edge portions of land portions defining the input port-side channel groove opposite to the land portion on the rotor side. Therefore, noise such as a fluid sound generated in conventional systems can be reduced.

Furthermore, according to the present invention, recess grooves are formed in land portions of the rotor to oppose the return port-side channel grooves, and fluid discharge holes are open in these recess grooves. Therefore, a smooth fluid flow can be obtained in the fluid control valve device regardless of a simple arrangement as is the case with the above arrangement. As a result, noise generated in conventional systems can be reduced also in this arrangement.

What is claimed is:

1. A fluid control valve device comprising:
   a sleeve having an inner circumferential surface in which two types of axial channel grooves communicating with an input port and a return port are formed in a circumferential direction, and left and right output ports are open in land portions between said channel grooves;
   a rotor inserted in the inner circumferential surface of said sleeve so as to be rotatably held relative to said sleeve and having an outer circumferential surface in which channel grooves communicating with said axial channel grooves of said sleeve are formed in the circumferential direction at positions opposite to said land portions in which said output ports of said sleeve are open, and first and second land portions are formed at positions opposite to said channel grooves of said sleeve; and
   a first recess groove formed in said first land portion of said rotor to oppose a fluid supply hole communicating with said input port and open in said channel groove of said sleeve.

2. A device according to claim 1, wherein a groove bottom of said first recess groove formed in said first land portion for directly receiving a fluid from said fluid supply hole is formed to have an arcuated surface with respect to a section perpendicular to an axis thereof.

3. A device according to claim 1, wherein the groove bottom of said first recess groove formed in said first land portion is formed to have an arcuated surface in an axial direction thereof.

4. A device according to claim 1, wherein two side edge portions on a port side of said first land portion having said first recess groove are formed by inclined surfaces.

5. A device according to claim 1, further comprising, in said second land portions of said rotor having fluid discharge holes communicating with said return port and open in said channel grooves of said sleeve, second recess grooves constituting opening portions of said fluid discharge holes in said second land portions.

6. A device according to claim 5, wherein two side edge portions on a port side of each of said second land portions having said second recess grooves are formed by inclined surfaces.

7. A fluid control valve device comprising:
   a sleeve having an inner circumferential surface in which two types of axial channel grooves communicating with an input port and a return port are formed in a circumferential direction, and left and right output ports are open in land portions between said channel grooves;
   a rotor inserted in the inner circumferential surface of said sleeve so as to be rotatably held relative to said sleeve and having an outer circumferential surface in which channel grooves communicating with said axial channel grooves of said sleeve are formed in the circumferential direction at positions opposite to said land portions in which said output ports of said sleeve are open, and first and second land portions are formed at positions opposite to said channel grooves of said sleeve; and
   recess grooves formed in said second land portions of said rotor having fluid discharge holes communicating with said return port and open to said channel grooves of said sleeve, and constituting opening portions of said fluid discharge holes.

8. A device according to claim 7, wherein two side edge portions on a port side of each of said second land portions having said recess grooves are formed by inclined surfaces.

9. A device according to claim 7, further comprising a second recess groove formed in said first land portion of said rotor to oppose a fluid supply hole communicating with said input port and open to said channel groove of said sleeve.

10. A device according to claim 9, wherein two side edge portions on a port side of said first land portion having said second recess groove are formed by inclined surfaces.

* * * * *